United States Patent [19]

Mueller, Jr.

[11] 4,266,616
[45] May 12, 1981

[54] DRAFT SENSING APPARATUS WHEREIN EFFECT OF VERTICAL DEFLECTION REDUCED TO INSIGNIFICANT LEVELS COMPARED TO HORIZONTAL DEFLECTION

[75] Inventor: Otto Mueller, Jr., Detroit, Mich.
[73] Assignee: Massey-Ferguson Inc., Detroit, Mich.
[21] Appl. No.: 53,620
[22] Filed: Jun. 29, 1979
[51] Int. Cl.³ .......................................... A01B 63/112
[52] U.S. Cl. ........................................................ 172/7
[58] Field of Search ..................... 172/7, 8, 9, 10, 11, 172/12

[56] References Cited

U.S. PATENT DOCUMENTS

| | | | |
|---|---|---|---|
| 3,888,315 | 6/1975 | Elfes et al. | 172/7 |
| 4,206,813 | 6/1980 | Mueller, Jr. et al. | 172/7 |
| 4,213,503 | 7/1980 | Elmberg et al. | 172/4.5 |

Primary Examiner—Richard T. Stouffer
Attorney, Agent, or Firm—John C. Thompson

[57] ABSTRACT

A draft sensing apparatus for an agricultural tractor or the like. The tractor is provided with a transversely extending bending shaft (18). The forward ends of a pair of lower draft links are secured to the outer ends of the shaft (18). The shaft (18) will bend in proportion to the draft in the links. The draft is sensed through a Hall effect device (52) carried by a yoke (54). The forward end of the yoke (54) is pivotally mounted on a fixed transversely extending shaft (48) and the rear portion of the yoke slideably receives the bending shaft (18). A link (60) pivoted to the yoke (54) has one end portion contacted by the shaft (18) and the other end is in contact with one end of a spring biased pin (70). The other end of the pin carries a permanent magnet (78) in axially alignment with the sensor (52). As the shaft deflects as the draft varies the magnet (78) will be shifted towards and away from the sensor (52) causing a voltage variation in line (98). By mounting the sensor (52) in the manner indicated the effect of vertical deflection of the bending shaft (18) will be reduced to insignificant levels as compared to horizontal deflection.

13 Claims, 5 Drawing Figures

DRAFT SENSING APPARATUS WHEREIN EFFECT OF VERTICAL DEFLECTION REDUCED TO INSIGNIFICANT LEVELS COMPARED TO HORIZONTAL DEFLECTION

TECHNICAL FIELD

The present invention relates generally to a draft sensing apparatus for sensing the draft on the hitch of a tractor, and more particularly to a draft sensing apparatus for sensing and indicating the draft imposed upon an elongated bendable shaft by a tractor three-point hitch, the draft sensing apparatus including an electrical displacement transducer or sensor mounted in such a manner than only draft forces will be sensed, the sensor preferably being a Hall effect sensor having its greatest sensitivity in light draft applications.

PRIOR ART

Tractors, particularly of the agricultural type, generally utilize a vertically shiftable threepoint hitch linkage for coupling an implement to the tractor. A draft sensing apparatus is customarily employed which measures the draft load between the implement and the tractor and acts through a draft control system to raise or lower the hitch and implements mounted thereon so as to maintain a substantially constant preset draft load. Various means of sensing the draft forces have been employed including having either the upper or the lower links connected to the tractor through a resilient member. One such resilient member may be a transversely extending elongated shaft supported in spaced apart fulcrum supports, the forward end of the lower draft linkage being secured to end portions of the shaft. A measuring device can be utilized to sense the movement of a portion of the sensing arm, and one such measuring device is illustrated in U.S. Pat. No. 3,022,830 issued Feb. 27, 1962. While the aforementioned patent employs a mechanical sensor it is also well known in the art to employ various electrical sensors, one such design being illustrated in U.S. Pat. No. 3,860,074 issued Jan. 14, 1975. The signal from either the mechanical sensor or the electrical sensor is utilized to control a valve assembly which will maintain fluid within a lift cylinder, cause the cylinder to be extended, or permit the fluid within the cylinder to be vented to a sump. Thus, while U.S. Pat. No. 3,022,830 utilizes a mechanical linkage for controlling the valve assembly, U.S. Pat. No. 3,994,347 issued Nov. 30, 1976, also teaches that solenoid actuated valves may be employed.

The draft forces which are to be measured are generally parallel to the forward direction of the tractor. However, other forces are present which may also cause movement of the shaft which can be either at a right angle to the draft forces or rotational forces caused by a rotation of the shaft. It is desirable that these other forces not be measured and this can be accomplished in theory by measuring the horizontal displacement of the vertical face of the shaft in the manner taught by U.S. Pat. No. 3,022,830. As the forces acting upon the sensing shaft and the tractor may be quite high, distortion of the tractor frame with respect to the sensing shaft can occur and if the sensor is carried by the tractor frame at a location remote from the sensing shaft these distortions of the tractor frame can lead to the transmission of erroneous signals.

The prior art has also recognized, as for example in U.S. Pat. No. 3,022,830, that it is desirable for the draft sensing apparatus to be more sensitive to changes in light draft loads than to changes in heavy draft loads.

OBJECTS AND SUMMARY OF THE INVENTION

It is the principal object of the present invention to provide a draft sensing apparatus utilizing an electrical displacement transducer or sensor so mounted that it will sense only draft loads and have a greater sensitivity in light draft application.

More particularly, it is an object of the present invention to provide a draft sensing apparatus for a tractor of the type having an elongated bendable transversely extending generally horizontal shaft mounted in spaced apart fulcrum supports in a tractor housing and draft members connected to the shaft at points spaced from the fulcrum supports whereupon forces in the draft members cause the shaft to bend, the draft sensing apparatus including a first support, a portion of which is disposed to one side of the bendable shaft, a second support mounted on said portion of the first support for movement relative thereto, the second support having a generally horizontal surface maintained in contact with a surface of the sensing shaft adjacent a portion of the sensing shaft whose movement is to be detected, and sensing means carried by the second support and operatively interconnected with said portion of the sensing shaft to detect movement of the sensing shaft in a horizontal plane. The sensing means illustrated in this application is a Hall effect sensor and it is so mounted that it has its greatest range of output during movement of the sensing shaft under relatively light draft loads.

The foregoing objects and other objects and advantages of the present invention as well as the structure required to accomplish the various objects will become more apparent after a consideration of the following detailed description taken in conjunction with the accompanying drawings in which a preferred form of this invention is illustrated.

DETAILED DESCRIPTION

Figure 1:
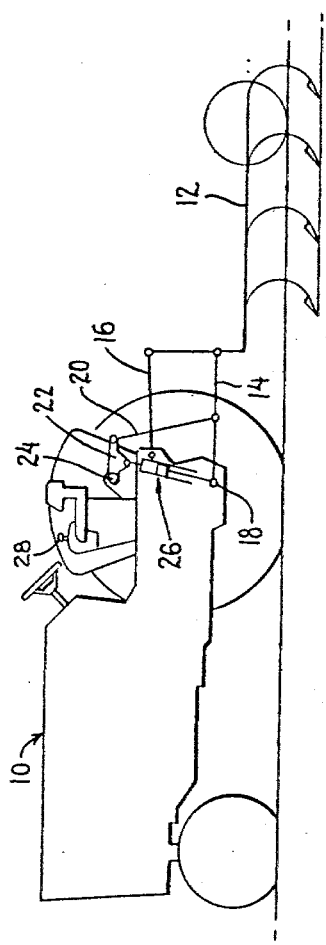
FIG. 1 is an outline of a tractor, hitch and implement combination on which this invention can be applied.

Referring now to FIG. 1, a tractor, indicated generally at 10, is shown interconnected with a semi-mounted implement such as a plow 12 by a conventional three-point hitch including lower draft links 14 and an upper link 16. The forward ends of the links 14 are pivotally secured to an elongated bendable sensing shaft 18 (more fully illustrated in FIG. 2) carried by the tractor. The forward end of the upper link 16 is also pivotally secured to the tractor. The lower links may be raised and lowered by means of lift links 20, the upper ends of which are connected to lift arms 22 which are in turn secured to a rock shaft 24. The lift arms can be moved upwardly and downwardly by a single acting hydraulic cylinder 26. The position of the hydraulic cylinder is controlled by a valve assembly (indicated generally at 27 in FIG. 5) which causes fluid to be maintained in the cylinder, to be introduced into the cylinder or to be vented from cylinder in response to various command and feedback signals. Thus, the tractor operator may set a draft command signal through movement of the control lever 28. A draft feedback system which includes the novel draft sensing apparatus of this invention is provided which will cause the valve assembly 27 to be shifted into the position where fluid is maintained within the cylinder once the desired draft has been attained. The operation of the valve assembly in conjunction with the command and feedback signals will be more fully described below.

Figure 2:
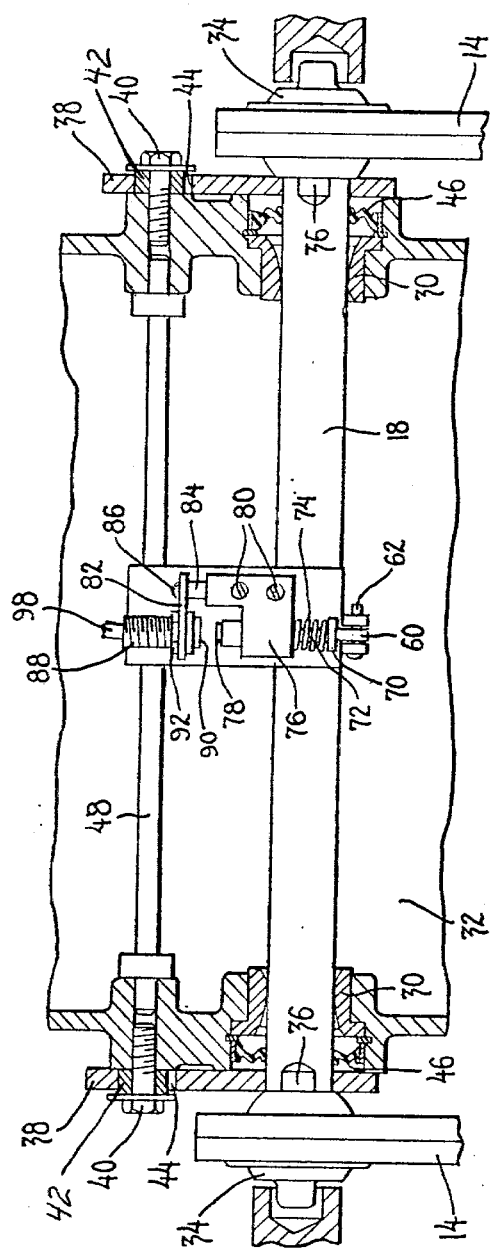
FIG. 2 is a general cross-sectional view, taken along a horizontal line, and showing the draft sensing apparatus of this invention along with its mounting on the tractor.
Figure 3:
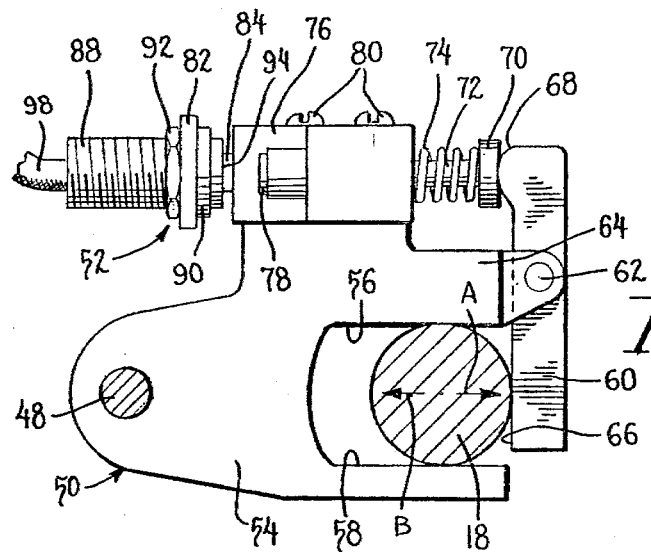
FIG. 3 is an enlarged sectional view taken along the line 3—3 in FIG. 2.
Figure 5:
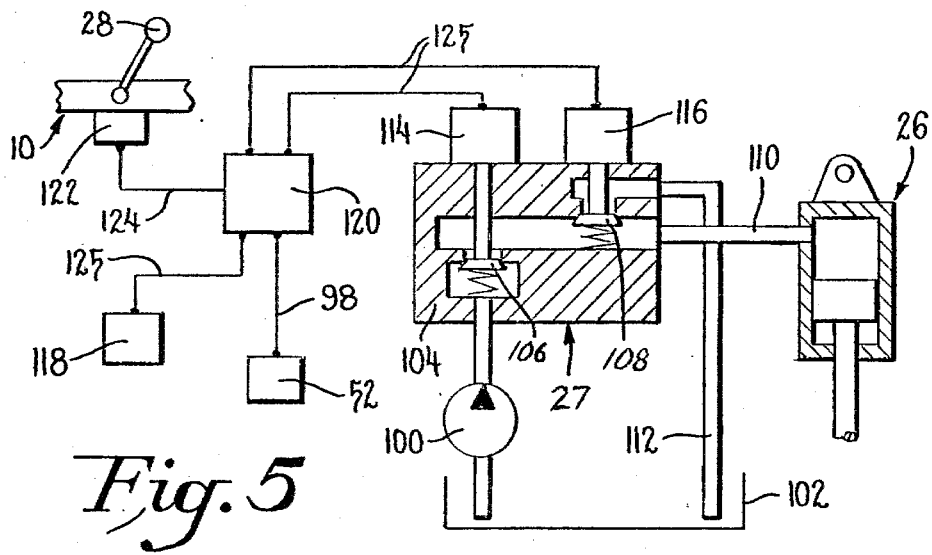
FIG. 5 is a schematic view illustrating a hydraulic and electrical circuit which may be associated with this invention.

The novel draft sensing apparatus of this invention is illustrated in FIGS. 2, 3 and 5. In FIG. 2 the lower links are shown supported at the ends of the sensing shaft 18 which is, in turn, supported by fulcrum supports in the form of bearings 30 within the tractor housing or frame 32. The shaft 18 has reduced end portions which receive ball joints 34 carried by the front end of the lower links. Inwardly of each of the ball joints the shaft is provided with flats 36 which are engaged by plates 38 which are in turn secured within the housing 32 by bolts 40 and bushings 42 which pass through elongated horizontally extending slots 44. An oil seal 46 of conventional construction is disposed in a recess between each of the bearings 30 and the associated plate 38.

Mounted within the housing are various components of the draft sensing apparatus, these components including a first support 48 in the form of a shaft, a second support indicated generally at 50, the second support being pivotally mounted on the first support 48. In addition, a sensor, indicated generally at 52, is mounted on the second support. As can best be seen from FIG. 2 the first support or shaft 48 has its ends disposed within the apertures which receive the bolts 40, the axis of these apertures being concentric with each other and lying in the same horizontal plane as the axis of the shaft 18 when it is in an unstressed position. It should be appreciated that as the support 48 is mounted closely adjacent to the shaft 18 that there will be little deflection of the shaft 48 relative to the shaft 18 as the tractor frame is distorted during heavy draft loads. In addition, by mounting opposed ends of the shaft 48 on opposite sides of the tractor, tractor deflection will average out. This is desirable as frequently the opposed sides of the tractor will deflect in opposite directions.

The second support which is indicated generally at 50 includes an apertured yoke 54, the shaft 48 passing through the aperture and supporting the yoke 54 for rotational movement about the shaft 48. The yoke 54 is provided with upper and lower horizontally extending guide surfaces 56, 58, respectively. The distance between these two guide surfaces is such that at least one of the surfaces 56, 58 will be maintained in contact with either the upper or the lower surface of the shaft 18. There shall be minimum clearance, for example 0.04 mm., to allow free movement of the shaft relative to the yoke. A pivoted link 60 has an intermediate portion thereof mounted for pivotal movement about a transverse axis defined by pivot pin 62 carried by the upward rearwardly extending bifurcated portion 64 of the yoke 54. When the parts are in their normal operating position, that is to say when no loads are being imposed upon the shaft 18, the lower inner surface 66 of the link 60 will lie in a vertical transversely extending plane. The upper end of the link is provided with a rounded nose portion 68 which is contacted by the head 70 of a pin 72 which is biased to the rear by a spring 74, the spring acting on the head of the pin 70 to insure that the surface 66 of the link 60 will be maintained at all times in contact with the rear surface of the shaft 18. The pin 72 is mounted for sliding movement within a longitudinally extending bore in a mon-magnetic mounting block 76, the other end of the pin being provided with a permanent magnet 78. As can best be seen from FIG. 2 the block 76 is secured to an upper surface of the yoke 54 by mounting screws 80.

A preferred sensor 52 includes a movable part, namely the pin 72 and magnet 78, and a fixed part. The fixed part is carried by a sensor mounting plate 82 which is mounted to lie parallel with the shaft 48, one end of the plate 82 being held between a bushing 84 and a screw 86 which extends into the mounting block 76. The sensor illustrated is a Hall effect sensor having a threaded portion 88 and an enlarged shoulder 90 is passed through an aperture in the mounting plate 82 and is secured in place by nut 92.

Figure 4:
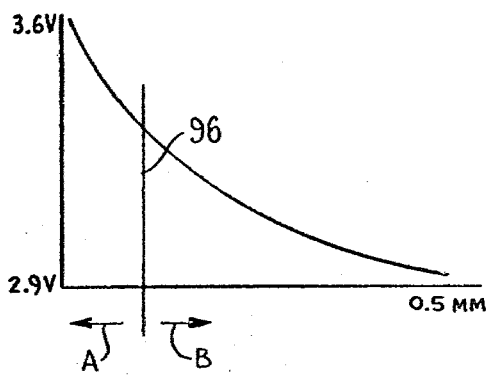
FIG. 4 is a view illustrating the output of the Hall effect sensor as related to its displacement.

If the shaft 18 should deflect in a horizontal plane the link 60 will be pivoted moving the magnet 78 towards and away from the surface 94 of the Hall effect sensor. At this point it should be noted that the draft links will generally be in tension but can also be in compression under certain situations. When the parts are in the normal position the output of the sensor will be that indicated by line 96 in FIG. 4. If the links should be in compression the sensing shaft 18 will move in the direction indicated by the arrow A, thus, increasing the voltage across the leads 98. If the sensing beam is in tension it will move in the direction indicated by the arrow B, thus, decreasing the voltage from the normal value. As can be seen from the graph in FIG. 4 the initial movement of the shaft when in tension will have the greatest effect on the output voltage of the sensor and as the tension on the links are increased the change in the output voltage will decrease per unit of movement of the shaft 18. This feature is accomplished by having the magnet 78 move away from the face 94 of the sensor as the draft increases.

Referring now to FIG. 5, an electrical hydraulic system is illustrated in which this invention may be utilized. The hydraulic system includes, in addition to the valve, indicated generally at 27, and the hydraulic cylinder assembly indicated generally at 26, a pump 100 and a sump or reservoir 102. The valve includes a valve body 104 in which are mounted two poppet valves 106, and 108. Poppet valve 106 controls the flow of fluid from the pump and thence through hydraulic line 110 to cylinder assembly 26. Similarly, poppet 108 controls the flow of fluid from the cylinder 26 to sump 102 through hydraulic line 112. Thus, it is apparent from FIG. 5 that when both poppet valves are closed fluid will be maintained in cylinder assembly 26. When only poppet 106 is open fluid will be introduced into the cylinder 26 from the pump 100 through line 110. When only poppet 108 is open fluid will be exhausted from the cylinder 26 to reservoir 102 through lines 110 and 112. The valve illustrated is essentially of the type illustrated in U.S. Pat. No. 3,022,830. While the aforementioned patent discloses mechanical linkage for controlling the valve, it should be apparent that solenoid actuators may be employed. Thus, two solenoid actuators 114, and 116 are shown mounted upon the valve body 104.

The electrical circuit it includes, in addition to the sensor 52 and the solenoids 114, and 116, a power supply 118, a signal processor 120, and a command signal generator 122 as well as various leads 98, 124 and 125 interconnecting the various components. The manual control 28 is mounted on a portion of the tractor 10 and is interconnected with the command signal generator 122.

Operation: Assuming that the plow 12 is in the raised position and the control 28 is in the raise position, both of the poppet valves 106 and 108 will be closed and the cylinder 26 will be in its fully extended position. When the operator desires to start the plowing he will shift the lever 28 to the lower position. This will cause the command signal generator 122 to send a different signal to the processor 120 through lead 124, the processor in turn actuating solenoid 116 to open valve 108 venting fluid within cylinder 26 thereby permitting the plow to lower. The command signal can be a change in voltage and, thus, the command signal generator can be a variable potentiometer. Similarly, the signal processor can be either an analog device, such as a wheatstone bridge circuit, or a digital device such as a microprocessor. In any event, the signal processor compares the signals received from the lead 124 and the lead 98 to operate the solenoids 114 and 116. Assuming that the command signal generator is a variable potentiometer, its voltage is dropped as the lever 28 is moved to the lowered position and this will impose an unbalanced condition in the processor 120 causing the solenoid 116 to be actuated. As the plow is lowered draft will be increased thereby causing a drop in the output voltage of the sensor until a balanced condition is restored within the signal processor 120. The processor will now stop actuating the solenoid 116, permitting the valve 108 to close. If during plowing increased draft shall be encountered there will be a further drop in the output voltage of the sensor 52 which will again establish an unbalanced condition within the processor 120. At this time it should be appreciated that the circuit is unbalanced in a different direction, that is to say that this time the feedback voltage in line 98 is less than the command signal voltage in lead 124 and, therefore, the other solenoid 114 will be actuated causing the valve 106 to be opened which in turn will cause the plow to be raised until the desired draft force is reestablished.

While the foregoing has been described with the employment of a Hall effect sensor, it is possible to employ other forms of sensors. Thus, an inductive sensor such as a linear variable differential transformer may be employed. Alternatively, capacitive, resistive, optical or sonic sensors may be employed. Similarly, other forms of command signal generators and signal processors may be employed, and other forms of valves may also be employed.

What is claimed is:

1. A tractor draft sensing apparatus of the type having an elongated bendable transversely extending generally horizontal shaft mounted in spaced apart fulcrum supports in a tractor housing and draft members connected to the shaft at points spaced from the fulcrum supports whereupon forces in the draft members cause the shaft to bend, the draft sensing apparatus being responsive to bending of the shaft and being characterized by a first support, a portion of which is disposed to one side of the shaft;

a second support mounted on said portion of the first support for movement relative thereto, the second support having a generally horizontal surface maintained in sliding contact with a surface of the sensing shaft adjacent a portion of the sending shaft whose movement is to be sensed; and sensing means carried by the second support and operatively interconnected with said portion of the sensing shaft to detect movement of the sensing shaft relative to said second support in a horizontal plane, the parts being so arranged and constructed that the effect of vertical deflection of the sensing member will be reduced to insignificant levels as compared to horizontal deflection.

2. The tractor draft sensing apparatus as claimed in claim 1 further characterized by said portion of the first support being disposed in a horizontal plane which passes through the bendable shaft.

3. The tractor draft sensing apparatus as claimed in claim 1 further characterized by the first support being an elongated member supported by opposed portions of the tractor housing closely adjacent the fulcrum supports.

4. The tractor draft sensing apparatus as claimed in claim 3 wherein the first support is a shaft, the ends of which are received within opposed apertures in the tractor housing.

5. The tractor draft sensing apparatus as claimed in claim 1 wherein the second support is a yoke having spaced apart arms, at least one of said arms being provided with said horizontal surface.

6. The tractor draft sensing apparatus as claimed in claim 5 further characterized by said first support being parallel to said bendable shaft, and by said yoke being supported on said first support for relative rotational movement thereto.

7. The tractor draft sensing apparatus as claimed in claim 6 further characterized by one of said arms being provided with a bifurcated portion, a lever, and means pivotally supporting an intermediate portion of said lever on the bifurcated portion, one end of said lever being provided with a vertical surface in contact with said bendable shaft, and the other end of said lever being maintained in contact with said sensing means.

8. The tractor draft sensing apparatus as claimed in claim 7 in which the sensing means includes a first part mounted in fixed relationship relative to said yoke, and a second part mounted for relative movement thereto, said second part including a pin biased into contact with said other end of the pivoted lever.

9. The tractor draft sensing apparatus as claimed in claim 8 in which the fixed part of a sensor is a Hall effect sensor, and wherein the movable part contains a permanent magnet, the parts being so arranged and constructed that as the draft forces increase at a linear rate the output signal of the Hall effect sensor will have a progressively decreasing rate of change.

10. The tractor draft sensing apparatus as claimed in claim 9 wherein the first and second parts of the sensor are carried by a non-magnetic block which is in turn secured to the yoke.

11. The tractor draft sensing apparatus as claimed in claim 1 wherein the sensing means has a greater sensitivity when the sensing shaft is being deflected from its normal position than it has during subsequent deflection under high draft loads.

12. The tractor sensing apparatus as claimed in claim 11 wherein the sensing means is a Hall effect sensor.

13. The tractor draft sensing means as claimed in claim 1 further characterized by the provision of a link mounted on the second support for pivotal movement about a transversely extending axis and interconnecting the sensing means with said portion of the sensing shaft.

* * * * *